May 16, 1939.   R. E. KELLER   2,158,544
CLUTCH
Filed April 13, 1931   2 Sheets-Sheet 1
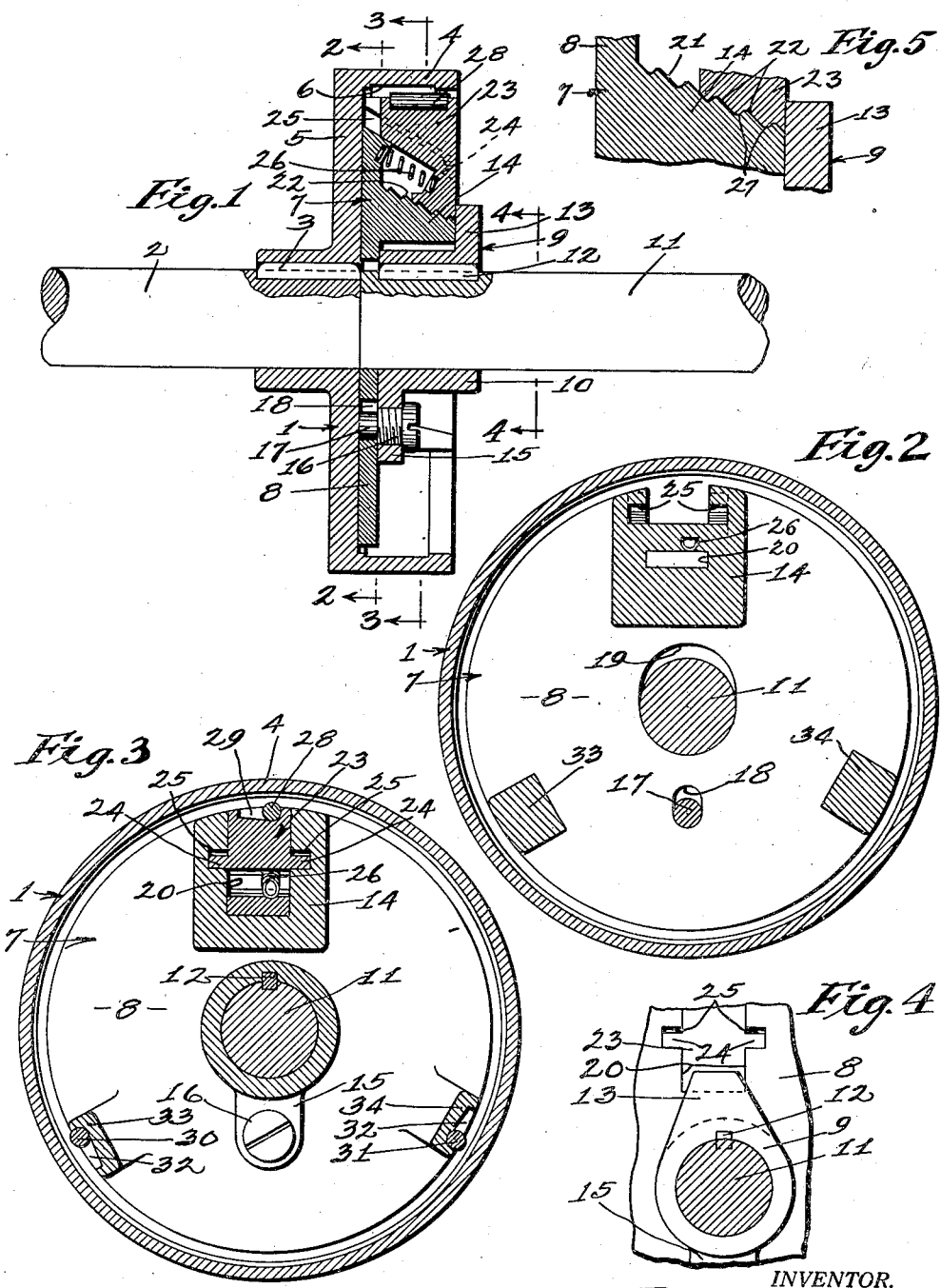
INVENTOR.
Rex E. Keller,
BY
ATTORNEYS.

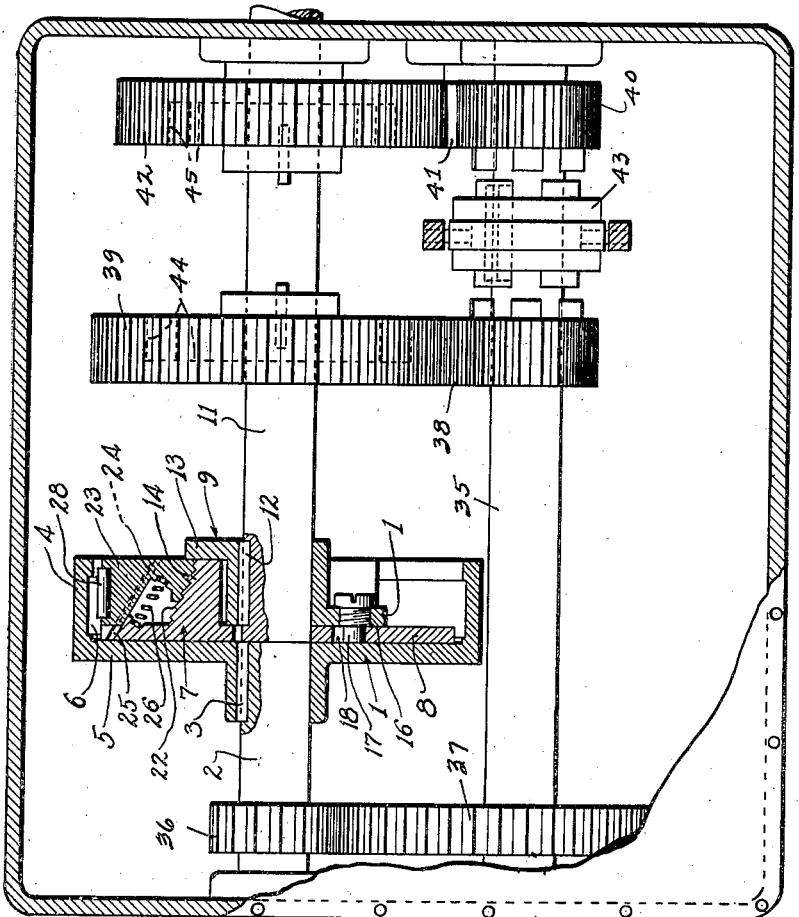

Patented May 16, 1939

2,158,544

UNITED STATES PATENT OFFICE 2,158,544

CLUTCH

Rex E. Keller, Los Angeles, Calif.

Application April 13, 1931, Serial No. 529,666

36 Claims. (Cl. 192—105)

This invention relates to and has for an object the provision of a centrifugally operable clutch adapted to connect a driving shaft with a driven shaft.

More particularly my invention comprehends the provision of a clutch comprising a driving member positively connected with a drive shaft and a driven member positively connected with a driven shaft, together with means rotatable with and adjustable on the driven member whereby in the rotation of the driven member said member attains a predetermined speed, and the driven member will be automatically gripped by the driving member for rotating the driven shaft at a speed synchronous with that of the drive shaft.

Other objects will appear as the description progresses.

In the accompanying drawings I have shown a preferred embodiment of my invention, subject to modification within the scope of the appended claims without departing from the spirit thereof. In said drawings:

Fig. 1 is a longitudinal section of a clutch embodying my improvements and connected with a driving shaft and a driven shaft.

Fig. 2 is a transverse section of the same on line 2—2 of Fig. 1.

Fig. 3 is a transverse section of the same on line 3—3 of Fig. 1.

Fig. 4 is an end view of the driven member of the clutch as seen on line 4—4 of Fig. 1.

Fig. 5 is a fragmentary enlarged view of the clutch showing the centrifugally operated clutch member in association with the driven member or core.

Fig. 6 is a sectional plan of a transmission mechanism embodying my improvements and arranged for connection with the motor of a vehicle.

Briefly described, my improvements include a driving member 1 in the form of a drum positively fixed to a drive shaft 2 by means of a key 3 or otherwise. The member 1 has an annular rim 4 and a web 5, and a shallow annular groove 6 is provided on the inner periphery of the rim 4 for purposes hereinafter described.

A driven member 7 is provided internally of the driving member 1 and is in the form of a disc which is adjustable in relation to the web 5 of member 1 so that the flat body portion 8 thereof will float relative to said web. A keeper 9 is provided adjacent the disc-like driven member 8 and has a hub 10 which is fixed to a driven shaft 11 by means of a key 12 or otherwise. The keeper 9 has a radially extended outer flange 13 which overlies a lug 14 on the disc 8 so as to prevent the dislodgement of a wedge member 23 hereinafter described.

Said keeper also has a radially extended inner lug 15 which overlies the disc 8 and carries a screw 16 with a reduced end portion 17 which extends thru a slot 18 in disc 8. The disc 8 has a central elongated aperture 19 thru which the shaft 11 extends. Thus, by reason of the slot 18 and aperture 19, the disc 8 is permitted to float on shaft 11 and relative to the driving member 1.

The lug 14 on member 7 is provided with a recess 20 which has a stepped lower portion 21 with a series of inclined grooves 22 formed therein. A centrifugally operable wedge member 23 is mounted in the recess 20 and has oppositely formed lateral ribs 24, 24 which are seated in inclined grooves 25, 25 at the sides of said recess. The wedge 23 is cut away on its lower side to provide a space in which a spring 26 is seated. Said spring is held in compression between the disc 8 and the lower portion of the wedge, as shown in Fig. 1, and is of but slight tension, for reasons to be hereinafter explained.

The lower end of the wedge 23 is provided with alternating teeth or grooves 27 which correspond in form to the portions 22 on the member 7, as shown in Fig. 5. It will be understood that the size and form of the portions 22 and 27 as illustrated in Fig. 5 is substantially exaggerated and the teeth and grooves may be rounded sufficiently so that the tension of spring 26 will cause the outward and downward movement of the wedge 23 over the teeth 22 of member 7 under conditions hereinafter explained.

The wedge 23 carries a clutch roller 28 which is loosely held in an inclined groove 29 formed in the upper side of the wedge and normally disposed out of alignment with the groove 6. When the wedge is thrown outwardly by centrifugal force and upwardly on its inclined guideways 25, the roller 28 will be moved into contact with the inner periphery of the rim 4 on driving member 1.

The inclined groove 29 and the inner periphery of rim 4 form two non-parallel surfaces.

The driven member 7 carries a pair of supplementary gripping rollers 30 and 31 which are supported in inclined grooves 32 on the outer sides of lugs 33 and 34 respectively, as shown in Fig. 3 and are alined with and adapted to be moved into and out of the groove 6. The rollers 28, 30 and 31 are mounted at angles of 120 degrees so that a diametrical line cutting the axes of shaft 11 and roller 28 will bisect the angle formed by radial lines cutting the axes of shaft 11 and roller 30, and shaft 11 and roller 31. It will be understood that the rollers 28, 30 and 31 are designed to be equally effective for making gripping contact between the members 7 and 1, and while all of said rollers are correspondingly adjustable in their grooves relative to the rim 4, only the roller 28 is carried in a wedge 23 which is influenced directly by centrifugal force for rendering the clutch operative.

In operation, when power is applied, as for instance in an automotive transmission of the type shown in Fig. 6, and as described in Letters Patent 1,734,491 granted to me November 5, 1929, from the driving shaft 2 to the driven shaft 11, thru the instrumentality of one or more sets of gears, the rotation of shaft 11 will be initiated.

In considering the operation of the clutch, it must be borne in mind that when the roller 28 is opposite the shallower part of the groove 29, it will prevent any movement of the wedge 23, whereas when the roller is opposite the deeper part of the groove 29, the wedge is permitted to move outwardly under centrifugal force, sufficiently to clear the teeth 22 and 27 and when thus moved makes possible the establishment of a driving connection between members 1 and 7 thru frictional contact of the rollers 28, 30 and 31 with said members, as will be hereinafter more fully described.

Continuing the description of the operation of the clutch, it is seen that when the speed of the driven shaft 11 increases to a rate such that centrifugal force tends to move the wedge 23 radially outward, the roller 28 will respond to centrifugal force before the wedge and be thrown outwardly against the rim 4 of the driving member 1. Upon such contact of said roller with said rim, while the latter overruns the driven member 7, the roller is frictionally moved into and maintained in a position opposite the shallow end of groove 29 and will therefore prevent movement of the wedge but will not at this time establish a driving connection between members 1 and 7, due to the wedge 23 being held by said roller against movement out of its innermost or "non-driving" position. Under these circumstances the roller 28 merely acts as a roller bearing between the rim 4 and wedge.

When the driving force operative on the member 1 is diminished to reduce the speed of the latter below that of member 7, while, however, the speed of said member 7 is such that centrifugal force will tend to move the wedge outwardly against action of spring 26, the roller 28 will be frictionally retracted from wedge obstructing position into the deeper end of groove 27 and due to this and the lost motion between ribs 24 and grooves 25, the wedge will now move outwardly in the inclined path of the guideways 25, sufficiently to cause the teeth 22 to clear the teeth 27 and to dispose the roller 24 in the small groove 6. The clutch unit will remain in this "free wheeling" condition as long as the driven member overruns the driving member, but when power is applied thru shaft 2 so that the rim 4 of driving member 1 overruns the driven member 7, said rim will move the roller 28 back into the shallow end of the groove 29 in the same manner as hereinbefore described. However, inasmuch as at this time, the wedge 23 is centrifugally held in the extended position gained when the roller 28 released the wedge, as hereinbefore described, the bottom of groove 29 is now closer to the rim 4 and consequently when the latter moves the roller towards the narrower end of groove 29, said roller is forcibly wedged between such parts and therefore moves the driven unit 7 bodily with respect to the driving unit, whereby the rollers 30 and 31, in addition to roller 28, will frictionally establish a "wedging" driving connection between said rim and member 7. This will establish a direct drive connection between shafts 2 and 11. It will be noted that the teeth 22 and 27 are at this time so engaged that the wedge is prevented from moving inwardly from its centrifugally extended position an extent as would release the drive connection. With this driving connection established, the application of power thru shaft 2 may be stopped and started as desired, without disturbing the drive connection, provided the driving member 1 is rotated at or above a predetermined speed at which the wedge is thrown out centrifugally, and the rim 4 overruns member 7, but when the driving member is rotated below the predetermined speed, or in other words, the driven member overruns the driving member, then the roller 28 will be moved by the overrunning action of the driven member back into the deeper end of the groove and the greater clearance afforded by said deeper end will allow the wedge to be moved outwardly under centrifugal force, whereby the teeth 22 and 27 will clear one another and the spring 26 will then move the wedge back into its innermost or non-driving position.

It is noted that neither the shoulder of the groove 6 or the teeth 22 and 27 are steep or abrupt enough to hold the wedge against moving under the influence of the spring 26 when the action of said spring is not overcome by centrifugal force acting on the wedge.

It will be apparent that the clutch shown and described herein is effective as a free wheeling clutch, as in other types of automotive transmissions, for when the speed of shaft 11 attains a speed greater than the speed of shaft 2 which would be relatively decelerated, the rollers 28, 30 and 31 would be forced into the lowermost portions of their grooves and permit a differential in speed between the driving and driven members of the clutch. However, under such conditions, when the speed of shaft 2 is again accelerated to a normal extent, that is to a speed synchronous with shaft 11, the power will be applied from shaft 2 thru the clutch to shaft 11, as before.

The keeper 9 limits the retractive movement of the wedge 23 on its incline while the web 5 of member 1 may limit the extension of the wedge to operative position.

It will be noted that the ribs 24 on the wedge are of slightly less thickness than the width of the grooves 25 so as to permit the movement of the wedge over the teeth 22.

The transmission shown in Fig. 6 embodies the axially alined driving and driven shafts 2 and 11, respectively, and a countershaft 35. Shafts 2 and 35 are positively connected by meshed gears 36 and 37 and shafts 11 and 35 are operatively connected by a forward driving act of gears 38 and 39 and reverse driving gears 40, 41 and 42. Gears 38 and 40 are loose on shaft 35 and are arranged for selective connection with a slidable clutch 43. Gear 41 is an idler, as usual in transmissions.

Gears 39 and 42 are clutch connected with shaft 11 by means of suitable internal clutch devices 44 and 45 respectively, permitting the driving of shaft 11 in either a forward or reverse direction from pinions 38 or 40, and the free rotation of gears 39 and 42 on shaft 11 in a direction counter to its driving direction relative to shaft 11.

Shaft 2 connects in a suitable manner with a vehicle motor 46.

What I claim is:

1. A clutch comprising axially alined driving and driven members, a centrifugally operable gripping device slidable in an inclined plane on said driven member, said gripping device and its supporting member having corresponding grooved surfaces for arresting the movement of the gripping device at different states, and means opposing centrifugal force and tending to retract said gripping device from operative position.

2. A clutch as characterized in claim 1, including means for locking the gripping member in extended position until the speed of the driven member is reduced to a predetermined extent.

3. A clutch as characterized in claim 1, including means for locking the gripping member in successively extended positions until the speed of the driven member has been reduced to correspondingly lower predetermined speeds.

4. A clutch comprising axially alined driving and driven members, a centrifugally operable gripping device slidable in an inclined plane on said driven member, and means opposing centrifugal force and tending to retract said gripping device from operative position, said gripping device including a roller adjustable in an inclined plane thereon to and from gripping engagement with the driving member, for the purpose described.

5. A clutch comprising axially alined driving and driven members, a centrifugally operable gripping device slidable in an inclined plane on said driven member, and means opposing centrifugal force and tending to retract said gripping device from operative position, said gripping device including a wedge and a gripping roller thereon, and cooperating gripping devices on the driven member and adjustable to and from gripping engagement with the driving member through the operation of the centrifugally operated gripping device.

6. A clutch comprising driving and driven members, a plurality of gripping rollers adjustably supported on the driven member, a centrifugally operable wedge slidable in an inclined plane on the driven member and forming a support for one of said rollers, and means for correspondingly adjusting the driven member relative to the driving member as said wedge is extended and retracted during the rotation of the driven member for moving all of said rollers into and from gripping engagement with the driving member.

7. A clutch as characterized in claim 6, including continuously operative means tending to retract said wedge to normal position.

8. A clutch as characterized in claim 6, including continuously operative means tending to retract said wedge to normal position, and means for locking said wedge in extended position when said rollers are in gripping engagement with said driving member.

9. A clutch as characterized in claim 6, including continuously operative means tending to retract said wedge to normal position, and means operative at successive positions in the movement of said wedge tending to prevent the restoration and retraction of the wedge until the speed of the driven member has been reduced to a point below predetermined speeds.

10. A clutch comprising driving and driven members, said driven member adjustable relative to the axis of the driving member, a pair of gripping rollers adjustable on the periphery of the driven member, a centrifugally operable wedge slidable in an inclined plane and disposed on a line bisecting the angle between said pair of rollers, and a gripping roller adjustable on the periphery of said wedge, the movement of said wedge serving to adjust the driven member and all of said rollers to and from operative engagement with the driving member.

11. A clutch as characterized in claim 10, including means for retacting said wedge to inoperative position when the driven member attains a predetermined reduced speed.

12. A clutch as characterized in claim 10, including means for locking said gripping rollers in gripping engagement with the driving member until the speed of the driven member is reduced to a predetermined extent.

13. A clutch as characterized in claim 10, including means for preventing the retraction of said wedge from successively extended positions until the speed of the driven member is reduced to correspondingly slower pedetermined speeds.

14. A clutch as characterized in claim 10, including means for locking said gripping rollers in gripping engagement with the driving member until the speed of the driven member is reduced to a predetermined extent, and means continuously operative for urging the wedge to normally retracted position.

15. A clutch as characterized in claim 10, including means for preventing the retraction of said wedge from successively extended positions until the speed of the driven member is reduced to correspondingly slower predetermined speeds, and means continuously operative for urging the wedge to normally retracted position.

16. A clutch comprising axially alined driving and driven members, a centrifugally operable gripping device adjustable on the driven member provided with means adjustable on the periphery thereof for effecting gripping engagement between the driving and driven members when said driving and driven members are rotated at predetermined speeds.

17. A clutch comprising axially alined driving and driven members, a centrifugally operable gripping device slidable on said driven member, means opposing centrifugal force and tending to retract said gripping device from operative position, and means for locking the gripping device in extended position until the speed of the driven member is reduced to a predetermined extent, said gripping device including a roller adjustable in an inclined plane thereon to and from gripping engagement with the driving member.

18. A clutch comprising driving and driven members, said driven member being radially adjustable relative to the driving member, peripherally adjustable gripping means on the driven member for engagement with the driving member, and radially adjustable gripping means adjustable on the driven member into and from gripping engagement with the driving member for rendering said first mentioned gripping means effective.

19. A clutch comprising driving and driven members, said driven member being radially adjustable relative to the driving member, peripherally adjustable gripping means on the driven member for engagement with the driving member, and centrifugally operable gripping means radially adjustable on the driven member into and from gripping engagement with the driving member for rendering said first mentioned gripping means effective.

20. A clutch comprising driving and driven members, said driven member being radially adjustable relative to the driving member, gripping devices mounted on the periphery of the driven member at spaced points and adjustable to and from gripping engagement with the driving member, and a centrifugally operable gripping device mounted on said driven member intermediate said gripping device and radially adjustable to and from gripping engagement with the driving member, operation of said intermediate gripping device serving to influence the operativeness of said other gripping devices.

21. In an automotive transmission, the combination of a driving shaft and a driven shaft, and a clutch for operatively connecting said shafts including a driving member positively connected to the driving shaft, a core, means for connecting said core with the driven shaft, and a gripping member rotatable with the core and slidable in an inclined plane paralleling the axis of the core, said gripping member being automatically adjustable as the speed of the driven shaft is increased to a predetermined point for operatively connecting the core with the driving member of the clutch for correspondingly rotating the driven shaft, and means for locking said gripping device in operative connection with the driving member of the clutch to prevent the disengagement thereof in the event of slight fluctuations in the speed of either shaft below a nominal speed.

22. A clutch comprising axially aligned driving and driven members, a centrifugal force responsive device carried by said driven member operable at any time after said driven member attains a predetermined speed and cooperable with said driving member for effecting a driving relationship between said members, said device being provided with means for preventing the effecting of a driving relationship between said members until the speed of the driving member is reduced to approximately that of said driven member at any time after said driven member attains a predetermined speed.

23. A clutch comprising driving and driven members, means associated with one of said members operable responsive to centrifugal force resulting from rotation thereof and at any speeds thereof above a predetermined rate, said means being cooperable with the other of said members for effecting a driving relationship between said members, said means being provided with other means for preventing the effecting of said driving relationship between said driving and driven members until the rotative speeds thereof are approximately synchronous, and operable for maintaining said driving relationship until the torque between said members is released.

24. A clutch comprising driving and driven members and means associated with said driven member cooperable with the driving member for effecting a driving relationship between said members and responsive to changes in centrifugal force resulting from variations in the rotative rate of said driven member, said means embodying provisions responsive to the speed differential between said members whereby the operation of said means may be controlled to effect a driving relationship between said members at any speed above a predetermined rate.

25. A clutch comprising axially aligned driving and driven clutch members, a centrifugally operable gripping device slidable in an inclined plane on one of said clutch members into and from gripping engagement with the other clutch member, said gripping device and its supporting member having corresponding means on adjacent surfaces for arresting the movement of the gripping device at successive stages, and means opposing centrifugal force and tending to retract said gripping device from operative position.

26. A clutch comprising axially aligned driving and driven clutch members, a centrifugally operable gripping device slidable in an inclined plane on one of said clutch members into and from gripping engagement with the other clutch member, and means opposing centrifugal force and tending to retract said gripping device from operative position, said gripping device including means adjustable in an inclined plane thereon to and from gripping engagement with the associated clutch member.

27. A clutch comprising axially aligned driving and driven clutch members, a centrifugally operable gripping device slidable in an inclined plane on one of said clutch members into and from gripping engagement with the other clutch member, means opposing centrifugal force and tending to retract said gripping device from operative position, said gripping device including a wedge and a gripping roller thereon, and cooperating gripping devices associated with said centrifugally operable device and commonly adjustable to and from operative position with said centrifugally operable device.

28. A clutch comprising driving and driven clutch members, means associated with said driven clutch member, responsive to centrifugal force resulting from rotation thereof and at any speeds thereof above a predetermined rate, said means being cooperable with the other of said members for effecting a driving relationship between said members, and means associated with said means for preventing the effecting of said driving relationship between said driving and driven members at any speed above said predetermined speed until the rotative speeds thereof are approximately synchronized.

29. A clutch comprising driving and driven clutch members, clutch engaging means responsive to centrifugal force carried by one of said members for frictional engagement with the other member means operable for preventing the operation of said clutch engaging means until said one of said clutch members attains a predetermined speed, and means preventing the effective engagement of said clutch engaging means with the other of said clutch members at any speed above said predetermined speed until the faster moving member has been approximately synchronized with the other clutch member.

30. A clutch comprising driving and driven clutch members, clutch engaging means carried by one of said members and movable in an inclined plane for operative engagement with the other member, and means preventing the disengagement of said clutch members until the rotative speed of the driving member has been retarded to a predetermined extent.

31. A clutch comprising driving and driven clutch members, clutch engaging means carried by the driven member for operative engagement with the other members, means operable for preventing the operation of said clutch engaging means until said one of said clutch members attains a predetermined speed of rotation, means for preventing the effective engagement of said clutch members at any speed above said predetermined speed until the faster moving member has been approximately synchronized with the other clutch member, and means preventing the disengagement of said clutch members until the rotative speed of the driven member has been retarded to a predetermined extent.

32. Clutch structure comprising a driving member, a driven member adapted to be connected thereto to be driven therefrom, said members being adapted to be rotated initially at relatively different rates, means carried by one of said members and cooperable with the other of said members for transmitting torque from said driving to said driven member, and two non-parallel and relatively-rotatable surfaces provided on said members for preventing the operation of said means until the relative rotation between said members has been substantially eliminated.

33. Clutch structure comprising a driving member, a driven member adapted to be connected thereto to be driven therefrom, said members being adapted to be rotated initially at relatively different rates, means carried by one of said members and cooperable with the other of said members for transmitting torque from said driving to said driven member, and means including a roller and two non-parallel surfaces operatively associated with said members and operable responsive to relative rotation therebetween for preventing the operation of said torque transmitting means until the relative rotation between said members has been substantially eliminated.

34. Clutch structure comprising a driving member, a driven member adapted to be connected thereto to be driven therefrom, said members being adapted to be rotated initially at relatively different rates, a centrifugally operable member carried by one of said members and operable for transmitting torque from said driving to said driven member, and means including a roller and two non-parallel surfaces operably associated with said members and operable in response to relative rotation between said members for preventing the movement of said centrifugally operable member into position to transmit torque between said driving and driven member.

35. A clutch comprising axially aligned driving and driven clutch members, a centrifugally operable frictional gripping device slidable on one of said clutch members into and from gripping engagement with the other clutch member, means opposing centrifugal force and operable for preventing the operation of said gripping device until said one of said clutch members attains a predetermined speed, and means for preventing a driving engagement between said gripping device and the associated clutch member until the speeds of the two clutch members are approximately synchronized.

36. A clutch structure comprising two members each mounted on a separate shaft and adapted normally to be driven independently, one of said clutch members being adapted to be driven normally at a speed greater than the other, centrifugally operated means carried by the normally slower speed member and operable at and above a predetermined speed and tending to couple said members into driving relation, and means preventing said coupling between said members until the faster member is slowed to substantial synchronism with the slower speed member, said coupling once effected being maintained for all speeds at or above said predetermined speed.

REX E. KELLER.